US005281760A

United States Patent [19]

Kikuchi et al.

[11] Patent Number: 5,281,760

[45] Date of Patent: Jan. 25, 1994

[54] TERMINAL FITTING FOR A HIGH VOLTAGE RESISTOR WIRE

[75] Inventors: Norio Kikuchi; Yoshimi Yukawa, both of Shizuoka, Japan

[73] Assignee: Yazaki Corporation, Tokyo, Japan

[21] Appl. No.: 885,352

[22] Filed: May 19, 1992

[30] Foreign Application Priority Data

May 31, 1991 [JP] Japan ............................ 3-040519[U]

[51] Int. Cl.[5] ...................... H02G 15/02; H01R 11/11

[52] U.S. Cl. ............................... 174/74 R; 174/84 C; 174/94 R; 174/94 S; 439/867; 439/877

[58] Field of Search ................. 174/74 R, 94 R, 94 S, 174/84 C; 439/125, 127, 128, 877, 867

[56] References Cited

U.S. PATENT DOCUMENTS 1,142,479 6/1915 Beck ................................ 439/867 X
2,483,424 10/1949 Martines .............................. 427/120
2,794,176 5/1957 Barnes ................................ 439/874
4,310,719 1/1982 Cross et al. ....................... 174/94 R
4,472,596 9/1984 Brown et al. ..................... 174/84 C
4,486,063 12/1984 Seifert et al. ........................ 439/442
4,815,200 3/1989 Ito .................................. 439/877 X
4,840,578 6/1989 Sato ................................ 439/877 X
4,863,391 9/1989 Mochizuki .......................... 439/125
5,025,554 6/1991 Dohi .............................. 439/877 X

FOREIGN PATENT DOCUMENTS 304667 1/1973 Fed. Rep. of Germany .
42-9703 5/1942 Japan .
49-43783 4/1974 Japan .
49-100031 8/1974 Japan .
55-27981 7/1980 Japan .
57-194267 12/1982 Japan .

*Primary Examiner*—Morris H. Nimmo
*Attorney, Agent, or Firm*—Sughrue, Mion, Zinn, Macpeak & Seas

[57] ABSTRACT

A fitting terminal for electrically connecting to a high-voltage resistor electric wire having a lead which is exposed by stripping an end portion of an insulation cover. The terminal fitting includes a main terminal which consists of an electric contact portion, a wire retaining portion and a conductor receiving plate disposed therebetween. The receiving plate is provided with a recess facing the wire retaining portion for receiving the exposed end of the conductor of the high-voltage resistor wire. The exposed end is adhered to the recessed portion of the receiving plate using a conductive adhesive substance.

8 Claims, 2 Drawing Sheets

TERMINAL FITTING FOR A HIGH VOLTAGE RESISTOR WIRE

BACKGROUND OF THE INVENTION

1. Field of the Invention

This invention relates to a terminal fitting for connecting a high voltage resistor wire in an ignition circuit of a vehicle.

2. Background

A conventional terminal fitting is constructed as shown in FIG. 4. The conventional terminal fitting includes a wire retaining portion d for clamping the wire, including conductor b and insulation cover a, and an electric contact portion c for receiving another terminal. The end portion of the conductor b is exposed by stripping an end portion of the insulation cover a. Thereafter, the end portion of the conductor is folded so that it is positioned along the outer surface of the insulation cover a, as illustrated. In this position, the wire retaining portion d is crimped to retain the conductor b between the retaining portion and the insulation cover.

Such a terminal fitting experiences problems in that electrical contact degradation occurs due to the loosening between the conductor and the terminal fitting. Additionally, when using a metal or non-metal conductor, the conductor may be damaged or broken due to the bending of the conductor around the insulation cover.

SUMMARY OF THE INVENTION

Accordingly, an object of this invention is to eliminate the above-described difficulty by providing a terminal fitting which includes a conductor receiving plate disposed between the clamping portion and the electric contact portion for receiving an end of the conductor so that it is not necessary to fold the conductor. More specifically, an object of the invention is to provide a terminal fitting which overcomes the problems associated with damaged or broken conductors and which ensures proper electrical contact between the conductor and the terminal portion of the terminal fitting.

The foregoing objects of the invention have been achieved by the provision of a terminal fitting comprising an electric contact portion, a wire retaining portion and a conductor receiving plate disposed therebetween. The conductor receiving plate is provided with a recess portion facing the wire retaining portion for receiving the end of the conductor which is adhered therein utilizing a conductive adhesive.

As a result of the present invention, damage to the conductor is prevented since the exposed end of the conductor is not subjected to the clamping pressure and is not bent. Further, the terminal fitting and the conductor are securely fixed to each other so as to provide an electrically reliable and durable structure.

DETAILED DESCRIPTION OF THE INVENTION

Preferred embodiments of this invention will be described with reference to the accompanying drawings.

Figure 1:
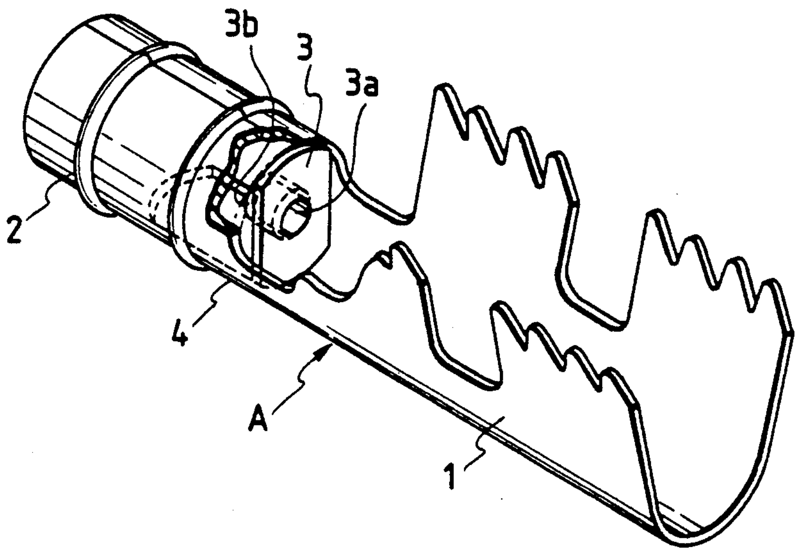
FIG. 1 is a perspective view showing a terminal fitting according to a first embodiment of the present invention.

FIG. 1 is a perspective view showing a terminal fitting A according to the present invention. A portion of FIG. 1 has been cut out to assist in illustrating a conductor receiving plate 3 which is an important feature of the invention. As shown in FIG. 1, the terminal fitting A includes an electric contact portion 2 and an electrical wire retaining portion 1. The receiving plate 3 is positioned between the electric contact portion 2 and the wire retaining portion 1 and is formed by cutting out a section of a base 4 of the terminal fitting A and positioning the cut-out part so that it is disposed orthogonally to the longitudinal axis of the terminal fitting A. The receiving plate 3 is provided with a recessed portion 3*a* defined by a cylindrical portion 3*b* facing the wire retaining portion 1.

Figure 2:
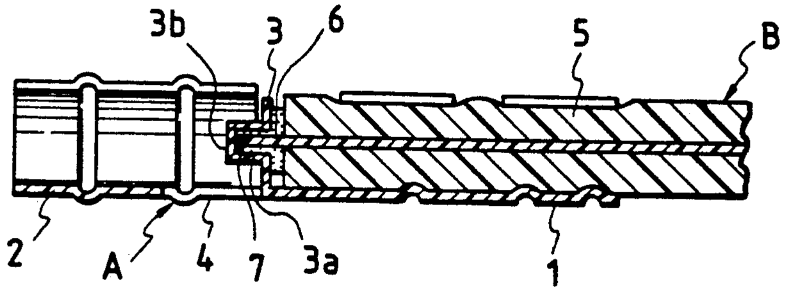
FIG. 2 is a sectional view showing a connecting state of a high-voltage resistor wire to the terminal fitting of FIG. 1.

FIG. 2 is a sectional view showing the connection of a high-voltage resistor wire B, including a central line made of a metallic or non-metallic conductor 6 and insulation cover 5, to the terminal fitting A of FIG. 1. The end of electric conductor 6 is exposed from the insulation cover 5 of the electric wire B and is inserted into the recessed portion 3*a* of the conductor receiving plate 3. An electrically conductive adhesive substance 7 (e.g. epoxy resin including carbon filler) is inserted into the recessed portion 3*a* to adhere the conductor thereto. The insulation cover 5 is crimped by the wire retaining portion 1 so as to secure the high-voltage resistor wire B to the terminal fitting A. The recess portion 3*a* may be previously formed on the conductor receiving plate by a press forming operation before the terminal fitting is formed in its cylindrical shape. Alternatively, another technique for forming the recess portion 3*a* is to provide a hole in the plate 3 and solder or adhere a separately produced cylindrical member to the plate 3 at the hole.

The depth of the recess portion 3*a* should correspond to the shape of the terminal fitting and the structure of the high-voltage resistor wire. Preferably, the depth should be in the range of 3 mm–7 mm.

Figure 3:
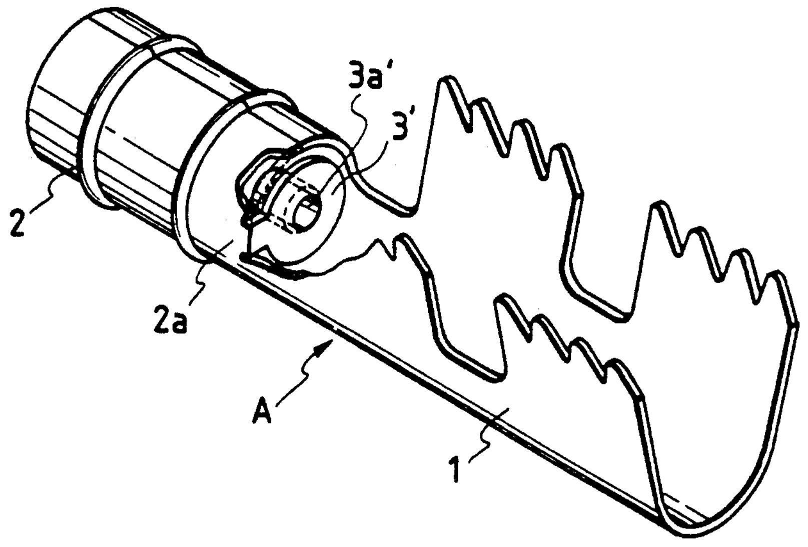
FIG. 3 is a perspective view showing a terminal fitting according to another embodiment of the present invention.
Figure 4:
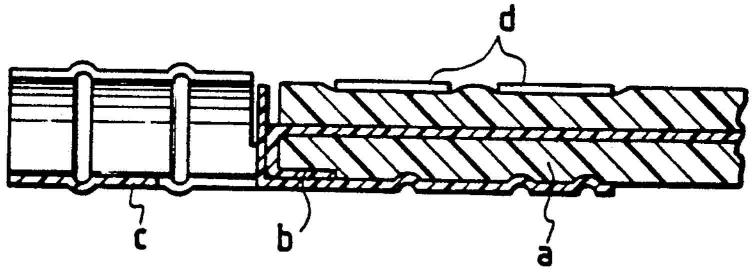
FIG. 4 PRIOR ART
FIG. 4 is a sectional view showing a conventional terminal fitting.

FIG. 3 illustrates another embodiment of the invention. In the FIG. 3 embodiment, the receiving plate 3' is provided on a side wall 2*a* as it project toward the wire retaining portion 1 and bent inwardly so as to be orthogonal to the longitudinal axis of the terminal fitting with the recessed portion 3*a*' facing the wire retaining portion 1. The recess portion 3*a*' is formed according to either of the methods described in the previous embodiment.

As was described above, the present invention is directed to a terminal fitting for receiving a high-voltage resistor electric wire having an exposed conductor extending from and end of the wire by stripping an end portion of an insulation cover. The terminal fitting includes an electric contact portion, a wire retaining portion and a conductor receiving plate disposed therebetween which is provided with a recess portion facing the wire retaining portion, wherein the exposed conductor of the wire retained by the wire retaining portion is adhered to the recess portion by a conductive adhesive. Therefore, the present invention allows the terminal fitting to be fitted to the conductor without folding the conductor so as to allow for uniform cramping pressure to be applied to the insulation cover of the wire. As a result, the holding force of the wire retaining portion is relatively high, and the conductor will not be damaged by the holding force when clamping the wire clamping portion. Furthermore, since the electric conductor is inserted into the recess portion provided in the conductor receiving plate and adhered thereto with an adhesive substance, the electrical conductivity between the conductor and the receiving plate is increased so that electrical reliability is increased.

What is claimed is:

1. A terminal fitting for connection to a high voltage wire including a conductor and an insulation layer circumscribing said conductor except for an exposed end portion of said conductor which extends from said insulation layer, said terminal fitting comprising:

a main terminal including a wire retaining portion at one end thereof for receiving and retaining said wire and an electrical contact portion disposed at the other end of said main terminal adapted to be connected to another terminal;

a conductor receiving plate fixedly secured and electrically coupled to said main terminal at a position between said wire retaining portion and said electrical contact portion, said plate being disposed orthogonally to a longitudinal axis of said main terminal and having a recessed portion disposed therein facing said wire retaining portion and extending in a direction parallel to a longitudinal axis such that said exposed end portion of a conductor can be longitudinally received in said recess without forming a bend in said exposed end portion; and means for adhering said exposed end portion of said conductor within said recessed portion and in electrical contact with said receiving plate.

2. The terminal fitting of claim 1, wherein said conductor receiving plate comprises a portion of said main terminal which is at least partially cut-out from a base portion thereof and bent inwardly so as to be disposed orthogonally to said longitudinal axis.

3. The terminal fitting of claim 1, wherein said recessed portion is integral to said receiving plate.

4. The fitting terminal of claim 1, wherein said receiving plate comprises a portion of said main terminal which is provided to project from a side wall thereof and bent inwardly so as to be disposed orthogonally to said longitudinal axis.

5. The fitting terminal of claim 1, wherein said wire retaining portion is substantially U-shaped including a plurality of prongs extending therefrom, said prongs being bendable over a wire to be connected to retain said wire within said retaining portion.

6. The fitting terminal of claim 1, wherein said adhesive is electrically conductive.

7. The terminal fitting of claim 1, wherein said recessed portion is cup-shaped.

8. The terminal fitting of claim 1, wherein said adhering means comprises an adhesive.

* * * * *